Aug. 13, 1929.   H. R. BIERY   1,724,554
COMBINATION CASH FARE RECEIPT AND HAT CHECK
Filed March 31, 1924
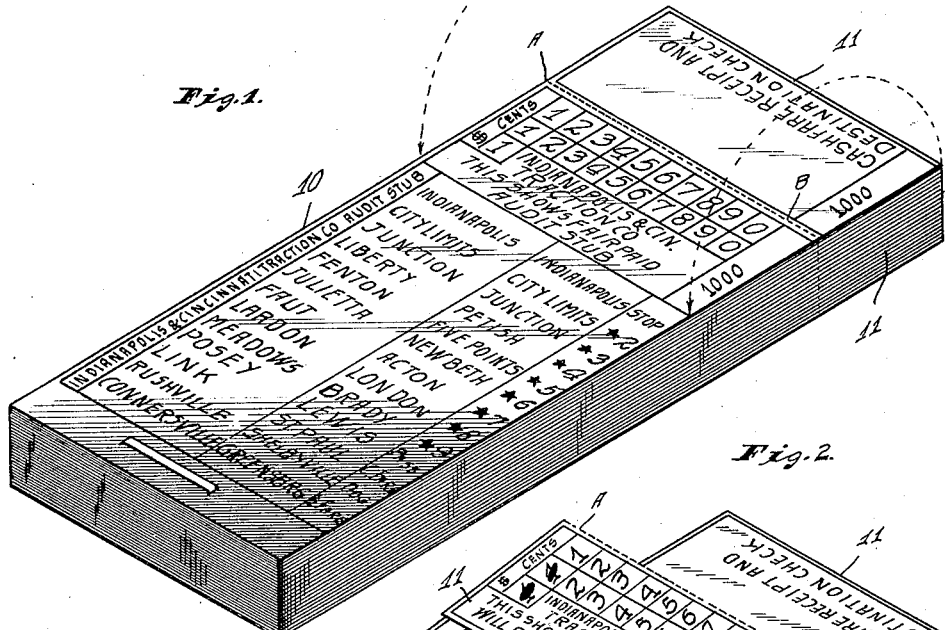
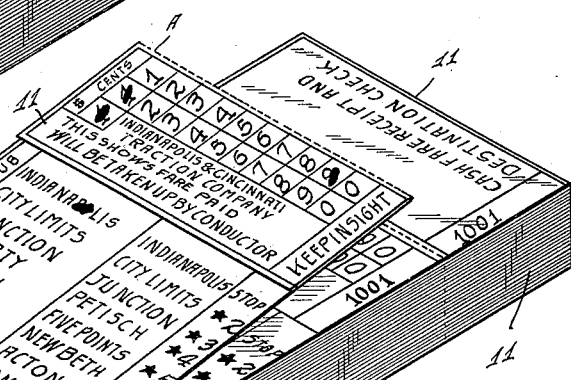
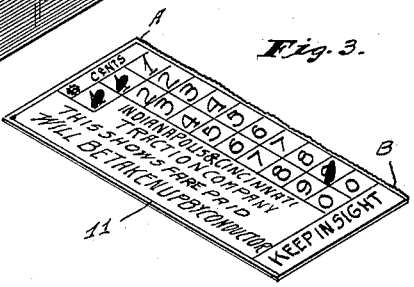
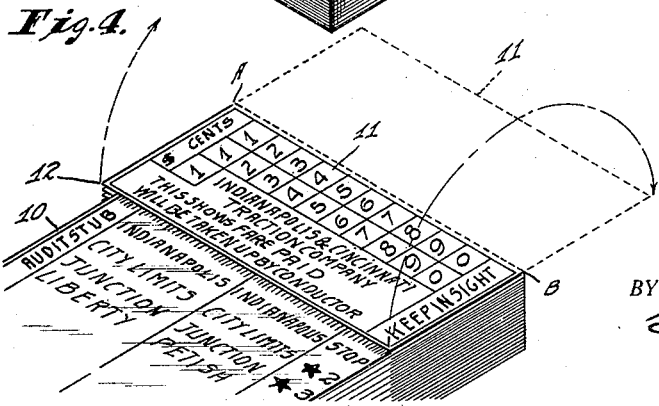
INVENTOR.
Hudson R. Biery,
BY
ATTORNEY.

Patented Aug. 13, 1929.

1,724,554

UNITED STATES PATENT OFFICE.

HUDSON R. BIERY, OF INDIANAPOLIS, INDIANA.

COMBINATION CASH-FARE RECEIPT AND HAT CHECK.

Application filed March 31, 1924. Serial No. 703,144.

Interurban car and railway conductors are usually provided with a book or pad of combined cash fare receipts and audit slips or stubs which they employ upon receipt of a cash fare to provide a permanent record of the fare for themselves and a cash fare receipt for the passenger. Such a pad or book is usually of about the same size as the ordinary pocket bank check book. The cash fare receipt is of substantially the same size as the audit stubs, and each cash fare receipt is joined to a corresponding audit stub along one of its sides, and folded so that it is superposed on such audit stub. The receipts and audit stubs are similarly printed showing the stations, the amount of fare collected, and any other data which may be desirable.

Upon collecting a cash fare, the conductor punches through the cash fare receipt and the corresponding audit stub at predetermined places to indicate the stations between which the passenger is riding and the amount of fare paid, the receipt is then torn from the audit stub and given to the passenger who usually drops it on the car floor. The conductor then punches the customary hat check and places it in the passenger's hat band or in some other place where it may be easily seen.

It is the object of my invention to combine the cash fare receipt with the hat check, thus eliminating the necessity of the conductor's punching an additional hat check after punching the cash fare receipt, and at the same time eliminating the littering of the car floor with discarded receipts. A further object of my invention is to permanently identify each hat check with its corresponding audit slip so that the audit slip corresponding to any hat check can readily be found. A further object of my invention is to produce a conductor's pad or book which, while still embodying audit stubs and fare receipts, will be cheaper to manufacture than is the present customary form of pad in which the pad is bound with each fare receipt folded over its corresponding audit stub.

I accomplish the above objects by providing each audit slip with a detachable portion, of the size of the customary hat check, which may be folded over the audit slip while both are punched at the desired places and which may then be detached and used as a destination check or hat check. I number the audit stubs and hat checks serially so that each hat check bears a number corresponding to that borne by its corresponding audit stub.

The accompanying drawing illustrates my invention: Fig. 1 is a perspective view of a pad of audit stubs with a hat check attached to each audit stub; Fig. 2 is a similar view of the pad with the upper hat check folded back over the upper audit stub and punched; Fig. 3 is a view of the detached hat check; and Fig. 4 is a modification of my invention in which the pad is bound with the hat checks already folded over the ends of the audit stubs.

The pad shown in Figs. 1 and 2 comprises a plurality of leaves, each leaf consisting of an audit stub 10 and a hat check 11. Each leaf is perforated along the line A—B to permit ready detachment of the hat check and also to facilitate folding of the hat check over the end of the audit stub. The audit stubs and the hat checks are serially numbered, with each hat check bearing a number corresponding to that of the audit stub to which it is attached. Each audit stub bears a printed list of stations and stops and any other data that may be desired; and, at its outer end, each audit stub is provided with one or more transverse rows of numerals. The number of rows and the number of numerals in each row are determined by the maximum amount of fare to be collected on any given car or train. On its under side (in the position shown in Fig. 1) each hat check is provided with one or more columns of numerals which correspond to the rows of numerals on the audit stub and which will lie over the rows of numerals on the audit stub when the hat check is folded over the end of the audit stub. This is clearly shown in Fig. 2.

After collecting a cash fare, the conductor folds the hat check 11 over the end of the audit stub 10, punches through the audit stub the stations between which the passenger rides and punches through both hat check and audit stub at one operation to indicate the amount of fare collected. The hat check is then detached and placed in the passenger's hat band or in some other convenient, visible location. As pointed out above, the numerals indicating fare paid are arranged on the audit stub in the same manner as the other data on the audit stub is arranged, so that all the data on the audit stub can be read from the bottom of the stub. This makes for expeditious checking of the stub when it passes through the auditing department of the railroad or interurban line. While the numerals on the hat check are disposed in locations corresponding to the locations of the same numerals on the audit stub, the numerals on the hat check are arranged so that they may be read from one end of the hat check. This is desirable, as the hat check is usually carried in a vertical position whether placed in the passenger's hat band or in some other location.

In the modification of my invention shown in Fig. 4 the conductor's pad is bound with the hat check already folded over the end of the audit stub. This eliminates the necessity of the conductor folding the hat check over, but it produces a pad which is materially thicker at one end than at the other end and which is more expensive to manufacture. When the pad is made in this form, I prefer to make the hat check of a length slightly greater than the width of the audit stub so that it projects beyond one side of the audit stub as shown at 12 (Fig. 4). This is of assistance to the conductor in finding the first unused audit stub remaining in the pad after several hat checks have been removed.

I prefer to print the audit stubs and hat checks on paper of sufficient weight so that the hat check can be easily handled. Such a grade of paper is slightly thicker and stiffer than the paper usually used for the customary cash fare receipt. By the use of this heavier grade of paper, I eliminate the possibility of tearing either the hat check or the audit stub when separating them, and the hat check possesses sufficient stiffness so that it can readily be handled by the conductor. While such a grade of paper is more expensive than that usually used for cash fare receipts, I more than compensate for this by eliminating the folding operation necessary in making the form of pad now generally in use.

By the use of the device described, the conductor produces a cash fare receipt and a destination check or hat check at one operation, and the hitherto customary large cash fare receipts, which the passengers usually throw on the floor, are eliminated.

I claim as my invention:—

A device of the character described comprising a strip of paper divided near one end into two unequal sections, the larger of which bears indicia adapting it for use as an audit stub and is provided adjacent the line of division with a plurality of columns of digits, the smaller section being adapted to serve as a hat check and bearing upon the opposite side of the strip a similar arrangement of columns of digits, whereby the two sections are adapted to be folded together for the purpose of simultaneous punching to indicate the amount of a fare.

In witness whereof, I have hereunto set my hand at Indianapolis, Indiana, this 29th day of March, A. D. one thousand nine hundred and twenty-four.

HUDSON R. BIERY.